(12) United States Patent
Roychoudhury et al.

(10) Patent No.: US 9,771,743 B2
(45) Date of Patent: Sep. 26, 2017

(54) IMPACT-ACTIVATED LATCH LOCK DEVICE, SYSTEM, AND METHOD FOR GLOVE BOX DOORS

(71) Applicant: FORD GLOBAL TECHNOLOGIES, LLC, Dearborn, MI (US)

(72) Inventors: Raj S. Roychoudhury, Bloomfield Hills, MI (US); Stacey H. Raines, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 69 days.

(21) Appl. No.: 14/956,496

(22) Filed: Dec. 2, 2015

(65) Prior Publication Data

US 2017/0159328 A1    Jun. 8, 2017

(51) Int. Cl.
E05B 77/04    (2014.01)
B60R 21/205    (2011.01)
E05B 83/30    (2014.01)
E05C 9/04    (2006.01)

(52) U.S. Cl.
CPC ............ *E05B 77/04* (2013.01); *B60R 21/205* (2013.01); *E05B 83/30* (2013.01); *E05C 9/04* (2013.01)

(58) Field of Classification Search
CPC ............ E05B 77/04; E05B 77/30; E05C 9/04
See application file for complete search history.

(56) References Cited

U.S. PATENT DOCUMENTS

| 4,552,399 | A |   | 11/1985 | Atarashi |   |
|---|---|---|---|---|---|
| 5,934,817 | A | * | 8/1999 | Kim | E05B 79/12 |
|   |   |   |   |   | 292/336.3 |
| 6,164,711 | A | * | 12/2000 | Neal | B60R 7/06 |
|   |   |   |   |   | 292/123 |
| 6,517,627 | B1 | * | 2/2003 | Atarashi | B82Y 30/00 |
|   |   |   |   |   | 106/401 |
| 7,341,300 | B2 |   | 3/2008 | Miller et al. |   |
| 8,123,261 | B2 |   | 2/2012 | Kikuchi et al. |   |
| 8,449,001 | B2 |   | 5/2013 | Whitens et al. |   |

(Continued)

FOREIGN PATENT DOCUMENTS

| DE |    10350683 A1 | 6/2005 |
|---|---|---|
| DE | 10200912710 A1 | 9/2010 |

OTHER PUBLICATIONS

Walter Schaupensteiner, Motor vehicle, has locking mechanism cooperating with slider of closing position holding mechanism, which is movable for opening cover and locked by locking mechanism during increased acceleration, German Patent Office, DE 10 2009 012 710 A1, English Abstract.*

(Continued)

*Primary Examiner* — James A English
(74) *Attorney, Agent, or Firm* — Vichit Chea; MacMillan, Sobanski & Todd, LLC

(57) ABSTRACT

A glove box latch system for an automotive vehicle is provided. A glove box door is mounted in an instrument panel housing. The glove box door comprises a movable latch rod and an adjacent lock plate. In the event that the vehicle is involved in a collision, the lock plate engages the latch rod. The engaged lock plate arrests movement of the latch rod, securing the latch rod in the closed position and preventing the glove box door from opening. Exemplary methods and structures for restraining movement of latch rods are provided.

20 Claims, 10 Drawing Sheets

(56) References Cited

U.S. PATENT DOCUMENTS

| | | | | |
|---|---|---|---|---|
| 8,931,803 | B2* | 1/2015 | Roychoudhury | B60R 21/02 280/752 |
| 9,004,550 | B2* | 4/2015 | Carabalona | E05L 377/06 292/251.5 |
| 9,156,408 | B1* | 10/2015 | Raines | B60R 7/06 |
| 2006/0208495 | A1* | 9/2006 | Talukdar | E05B 83/30 292/39 |
| 2007/0069525 | A1* | 3/2007 | Ghannam | E05B 77/04 292/216 |
| 2009/0079170 | A1* | 3/2009 | Bito | B60R 7/06 280/730.1 |
| 2011/0309640 | A1* | 12/2011 | Matsubara | E05B 63/248 292/159 |
| 2015/0008680 | A1* | 1/2015 | Suzuki | B60R 7/06 292/32 |
| 2015/0197966 | A1* | 7/2015 | Regnault | E05B 77/04 292/200 |
| 2016/0024821 | A1* | 1/2016 | Aselage | E05B 83/30 292/32 |

OTHER PUBLICATIONS

Walter Schaupensteiner, Motor vehicle, has locking mechanism cooperating with slider of closing position holding mechanism, which is movable for opening cover and locked by locking mechanism during increased acceleration, German Patent Office, DE 10 2009 012 710 Al, Machine Translation of Description.*

* cited by examiner

IMPACT-ACTIVATED LATCH LOCK DEVICE, SYSTEM, AND METHOD FOR GLOVE BOX DOORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to compartment door latches in automotive vehicles, and, more specifically, to systems, methods, and devices for preventing a glove box door from opening in an impact.

Injury from a crash event may be mitigated by active bolsters, padding, and/or airbags located at the glove box. In mitigating an impact, it is beneficial for the glove box door to remain closed and latched during, and immediately following, the impact.

In frontal impact crashes, a passenger's knees may impact the glove box door and force it to deform. Likewise, deformation may occur due to airbag or bolster expansion forces. This deformation, which is centered on the inner door where the latch is attached, sometimes causes the latch rods to retract and may potentially allow the glove box door to open. In many glove box door latch systems, the mechanism for maintaining the glove box in a closed position may be detrimentally affected by bolster or airbag deployment, by sudden passenger contact, or by other forces during a crash.

Accordingly, there is a need for improved devices, methods, and systems for maintaining the glove box door in a closed configuration during automobile collisions.

SUMMARY OF THE INVENTION

The present invention uses one or more locking plates to impede movement of a latch rod immediately following an impact and to strengthen the glove box door against either bowing or falling open. An impact event induces a mechanical interlock or lock plate to engage the latch rod mechanism to arrest movement. The force of the collision, passenger contact, or bolster deployment impels the lock plate into the locked configuration, thereby preventing the glove box door from unlatching.

In one aspect of the invention, an active glove box bolster system for a vehicle comprises an instrument panel housing defining a door space. A glove box door comprises latching system having a longitudinally-movable latch rod. A striker is provided on the housing for receiving the latch rod in a pocket between a front wall and a rear wall. The front wall slidably engages a sloped end of the latch rod during closing of the door to retract the latch rod until it enters the pocket. The latching system includes at least one interlock element along the length of the latch rod. Upon impact, the interlock element engages to resist movement of the latch rod in response to a bolster deployment force or a force against the door in a direction to push the door through the door space.

In accordance with the foregoing aspects of the invention, exemplary methods, systems, and structures are provided.

DETAILED DESCRIPTION OF PREFERRED EMBODIMENTS

Figure 1:
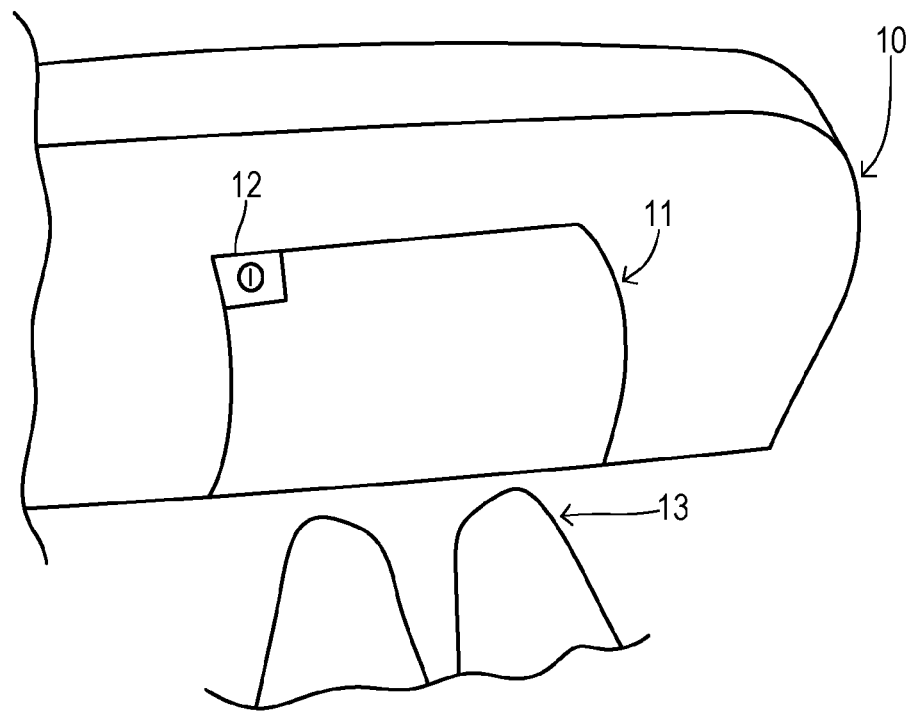
FIG. 1 depicts a glove box door system in a vehicle interior.

Active bolsters are integrated into glove box doors as a safety feature. An active bolster is a vehicle occupant protection device with a gas-inflatable bladder to absorb impacts and reduce injury to occupants during a crash. Active bolsters deploy in a vehicle crash to cushion the impact force of an occupant against an interior panel of the vehicle. As opposed to air bag cushions, which emerge from behind various openings upon inflation, active bolsters use the interior trim surface itself to expand upon sensing a crash event to absorb an occupant impact and dissipate energy by venting an inflation gas.

The bolster has an expandable hollow chamber typically formed by bonding a vehicle interior-facing front trim wall section and a rear bladder section. The front and rear sections may be attached around the periphery to join the two sections forming the chamber. The rear bladder is usually attached to a reaction surface or rear panel structural support.

When incorporating an active bolster into the door for a glove box or other storage compartment, the inside back plate of the door acts as a reaction surface which is relatively unmovable to the inflating bladder and the front panel pushing outward, toward the vehicle occupant (instead of into the storage compartment). The door back plate typically spans the opening so that the edges of the door overlap with the instrument panel or compartment frame in order to stop the door movement at a closed position.

The rear panel or back plate provides a supporting reaction surface and is joined to the internal bladder structure by attachment points or weld protrusions on the internal bladder structure, and corresponding attachment points or weld pads provided on the rear panel.

It is desirable to fabricate the back plate from a moldable thermoplastic for low cost, low weight, and easy attachment to the bladder wall—such as by hot plate welding. One potential problem with such a reaction wall is that it may have sufficient flexibility to bend during deployment of the bolster or during the impact of a passenger against the front panel. The bowing can result in compromised passenger restraint force, impaired bolster functionality, and unlatching of the glove box door.

In the normal course of operation, the glove box door, incorporating an active bolster in a non-inflated condition, opens and closes by rotating about a hinge. The hinge is integrally formed on the rear panel and rotatably attaches to the instrument panel. The glove-box door is releasably retained in the closed position by a latch mechanism provided in a latch housing of the rear panel. The latch mechanism cooperates with one or more latch apertures or striker pockets on the instrument panel or dashboard.

In a vehicle collision, the latch system may be presented with forces potentially causing loss of contact between the latch rod ends and the striker pockets. The cause of the loss of contact may be attributed to the glove box door deformation. Deformation of the door during impact and bolster deployment may cause bending about the centerline and pulling the latch rods in, and out of the striker pocket, because of the curved length exceeding the initial straight length. Loss of contact may also occur by sliding of the sloped ends of the rods against the rear walls of the strikers. One of the rods striking the back of the striker pocket may force it to be pushed in, causing the other rod to also retract because the latch rods are coupled together. Loss of contact may result in uncontrolled latch retraction leading to submarining or to the glove box door opening during inflation or impact. To prevent uncontrolled latch rod retraction, the collision force or bolster deployment impels the locking plate to arrest movement of the latch rods.

Referring now to FIG. 1, an instrument panel system 10 of an automotive vehicle includes an active glove box system 11 which includes a push button latch mechanism 12 which may be activated to open glove box system 11 to access a storage bin. Active glove box system 11 inflates to receive a passenger's knees 13 during a crash event in order to mitigate forces applied to the knees and body of the passenger.

Figure 2:
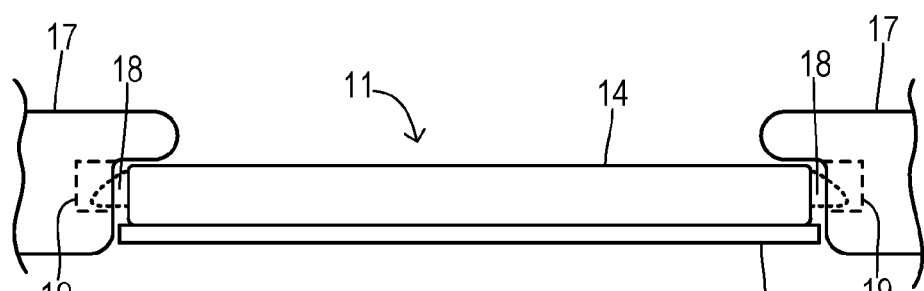
FIG. 2 is a top view of a glove box knee bolster system before a crash.
Figure 3:
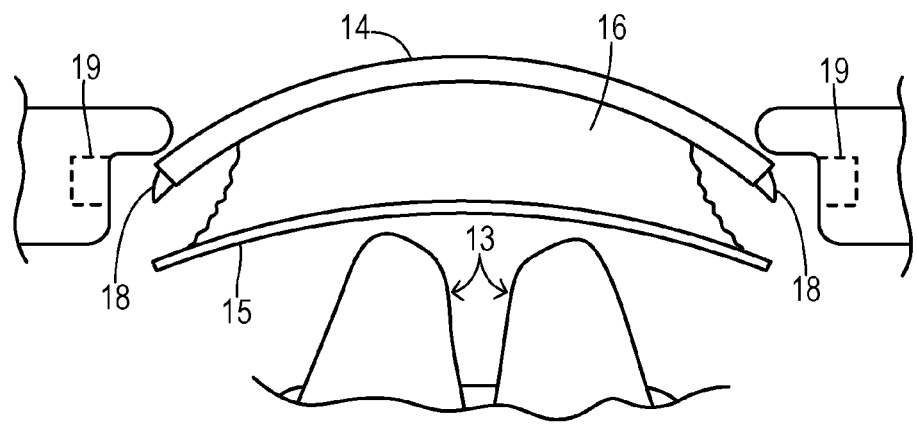
FIG. 3 is a top view of a prior art glove box knee bolster system during a crash.

As shown in FIGS. 2 and 3, system 11 includes a back panel 14, a trim panel 15 and a bladder wall 16 for inflating during a crash event using gas supplied by an electronically-triggered inflator when a crash event is detected. A door frame or surround 17 includes striker pockets 19 for receiving latch rods 18 which extend from each lateral side of door back panel 14. FIG. 3 shows an exaggerated deformation of back panel 14 during an impact. The bending may result in the release of the latch rods 18 from the pockets 19.

Turning now to FIGS. 4-7, the active bolster comprises a rear panel 14, an internal inflatable bladder 16, an inflation device 27, and a front trim panel 15. The bladder 16 may have a pleated (i.e., accordion-like) region that straightens out during inflation. The inflatable bladder 16 is welded or joined to the front trim panel around or near the perimeters of each of the bladder 16 and front trim panel 15 to form an inflatable hollow chamber 23.

Figure 4:
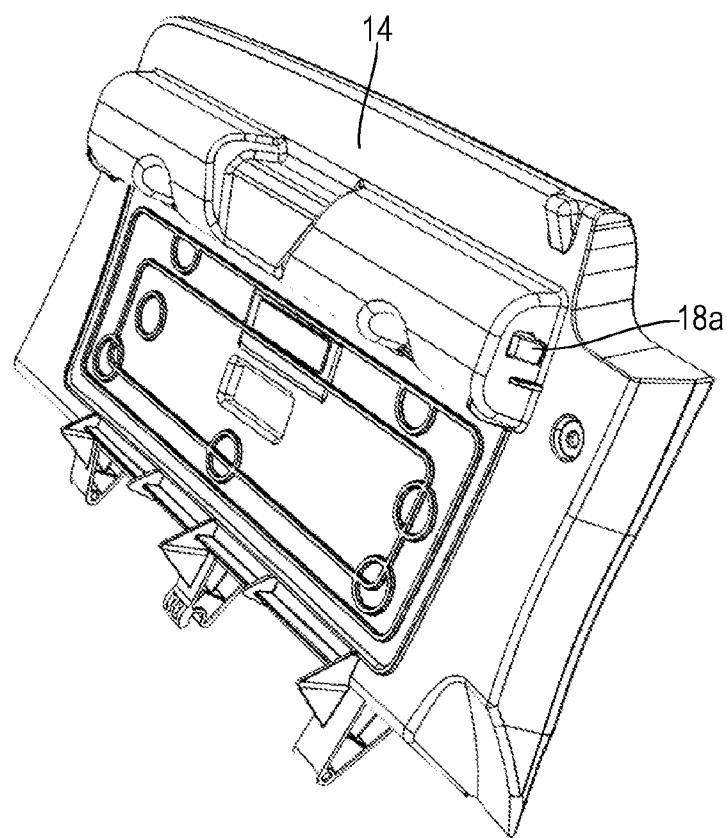
FIG. 4 is a perspective view of the receptacle side of a glove box door.
Figure 5:
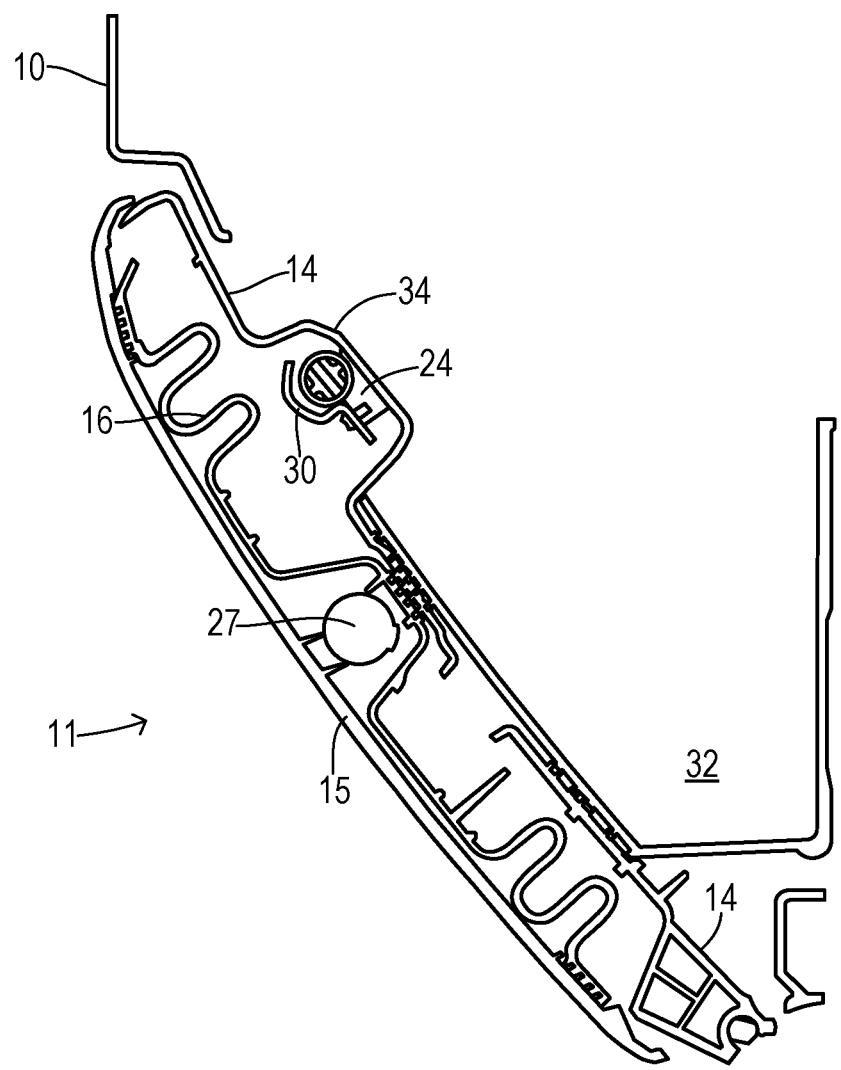
FIG. 5 is a vertical cross-sectional view of an un-deployed active glove box system showing a door back panel carrying the latch rod and locking plate.
Figure 7:
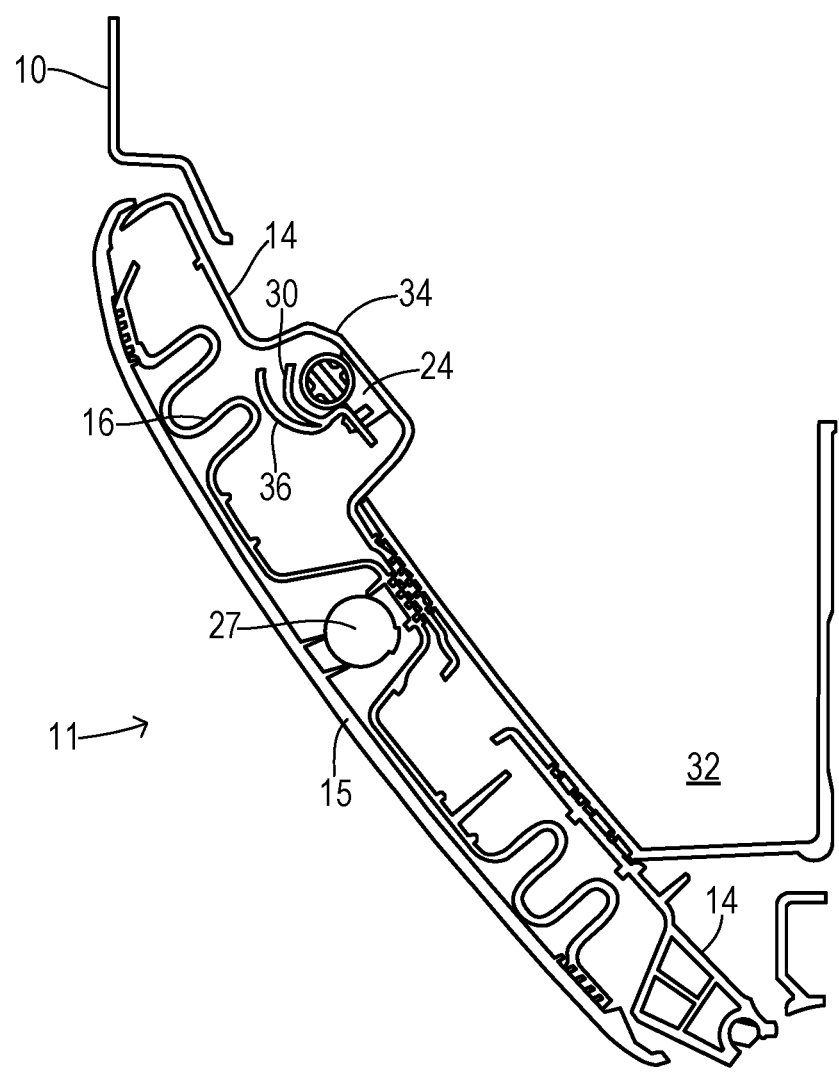
FIG. 7 is a vertical cross-sectional view of an un-deployed active glove box system showing a locking plate with a tab feature.

FIGS. 4, 5 and 7 show an embodiment of a glove-box door with a latch system and an active bolster in a pre-deployment, non-inflated condition. FIG. 4 is a perspective view of the receptacle side of a glove box door, showing the rear side of the back panel 14 and a pocket-engaging end of the latch rod 18a.

FIG. 5 is a vertical cross-sectional view of a closed and undeployed active glove box system. The glove box system 11 is mounted in the instrument panel 10 and provides a storage bin or receptacle 32. A lower portion of the door back panel 14 attaches to the instrument panel 10 at a hinge. An upper portion of the door back panel 14 attaches to the instrument panel 10 by the latch system housed in a latch housing 34 portion of the back panel 14. The door back panel 14 supports the latch rod coupler 24 and locking plate 30. The bladder wall 16 is attached to the back panel 14 at one or more attachment points 26. In the embodiment shown, the bladder also supports the inflation device 27. The bladder wall 16 is attached to the trim panel near the periphery of the rear side of the trim panel 15. The trim panel 15 front surface faces the passenger compartment.

Figure 6:
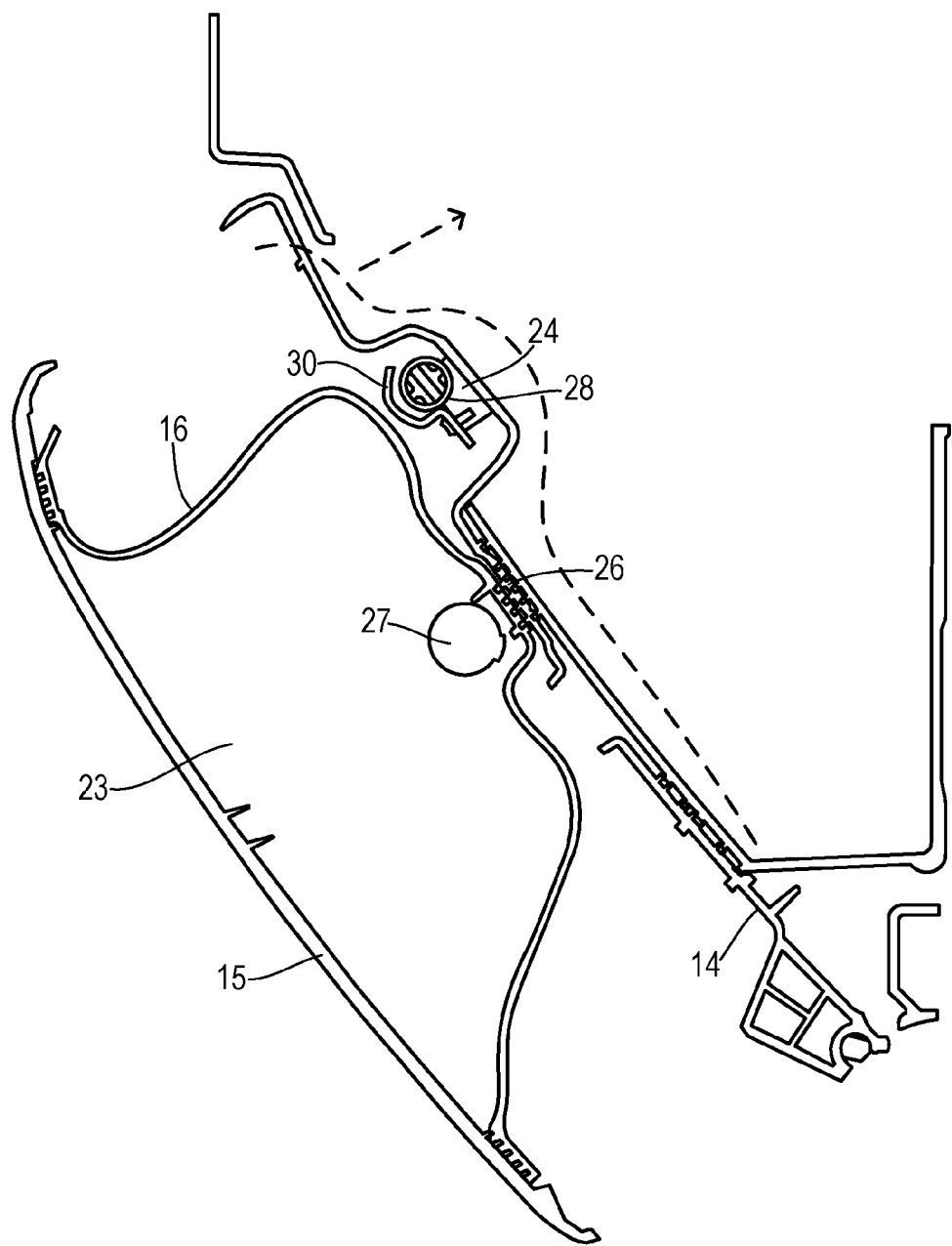
FIG. 6 is a vertical cross-sectional view of an active glove box system showing bolster deployment and locking plate activation.

FIG. 6 is a vertical cross-sectional view of an active glove box system showing bolster deployment and locking plate activation. FIG. 6 shows deployment of the active bolster caused by inflating chamber 23 with gas from an inflator 27. Since the back panel 14 is relatively stable, it functions as a reaction surface, and trim panel 15 moves forward into the passenger compartment during deployment. Because the inflating flexible bladder wall 16 pushes outward in all directions, the bladder wall 16 presses the locking plate 30 rearward, towards the latch system 28, during inflation. The narrow tolerance between the locking plate 30 and an interfacing part of the latch system 28 allows the locking plate to lodge against a portion of the latch system 28, quickly and tightly, thereby creating an interlock and arresting movement of the latch rods.

In the embodiment depicted in FIGS. 5 and 6, a portion of the bladder wall, before deployment, is positioned directly in front of the locking plate. In some embodiments the bladder wall is spaced about 1 mm from the locking plate. In some embodiments the bladder wall rests directly against the locking plate. In some embodiments the bladder wall is spaced about 0-3 mm from the locking plate.

FIG. 7 shows a vertical cross-sectional view of another embodiment of a closed and undeployed active glove box system. In the embodiment shown in FIG. 7, the locking plate comprises an extension paddle or tab 36 immediately adjacent the bladder wall 16, configured to transmit expansion force from the bladder wall 16 to move the locking plate 30. The tab may extend from a central portion of the locking plate and be positioned along an expansion path of the bladder wall. The tab may be used to quickly direct engagement of the locking plate with the latch system when the central portion of the locking plate, adjacent the latch rod, is spaced apart from the bladder wall.

In some embodiments, at least one attachment or weld point 26 of the bladder to the back panel 14 reaction surface is adjacent the locking plate. In some embodiments, the vertical distance between the locking plate and attachment point is 1-25% of the vertical span of the back panel. In some embodiments, the horizontal distance between the locking plate and attachment point is 1-25% of the width of the back panel.

In some embodiments, the placement of the inflator or the positioning, folding, and/or pleat shape of the bladder wall is designed to facilitate locking plate engagement with the latch system. In some embodiments, the vertical distance between the locking plate and inflator is 1-25% of the vertical span of the back panel. In some embodiments, the horizontal distance between the locking plate and inflator is 1-25% of the width of the back panel.

Figure 8:
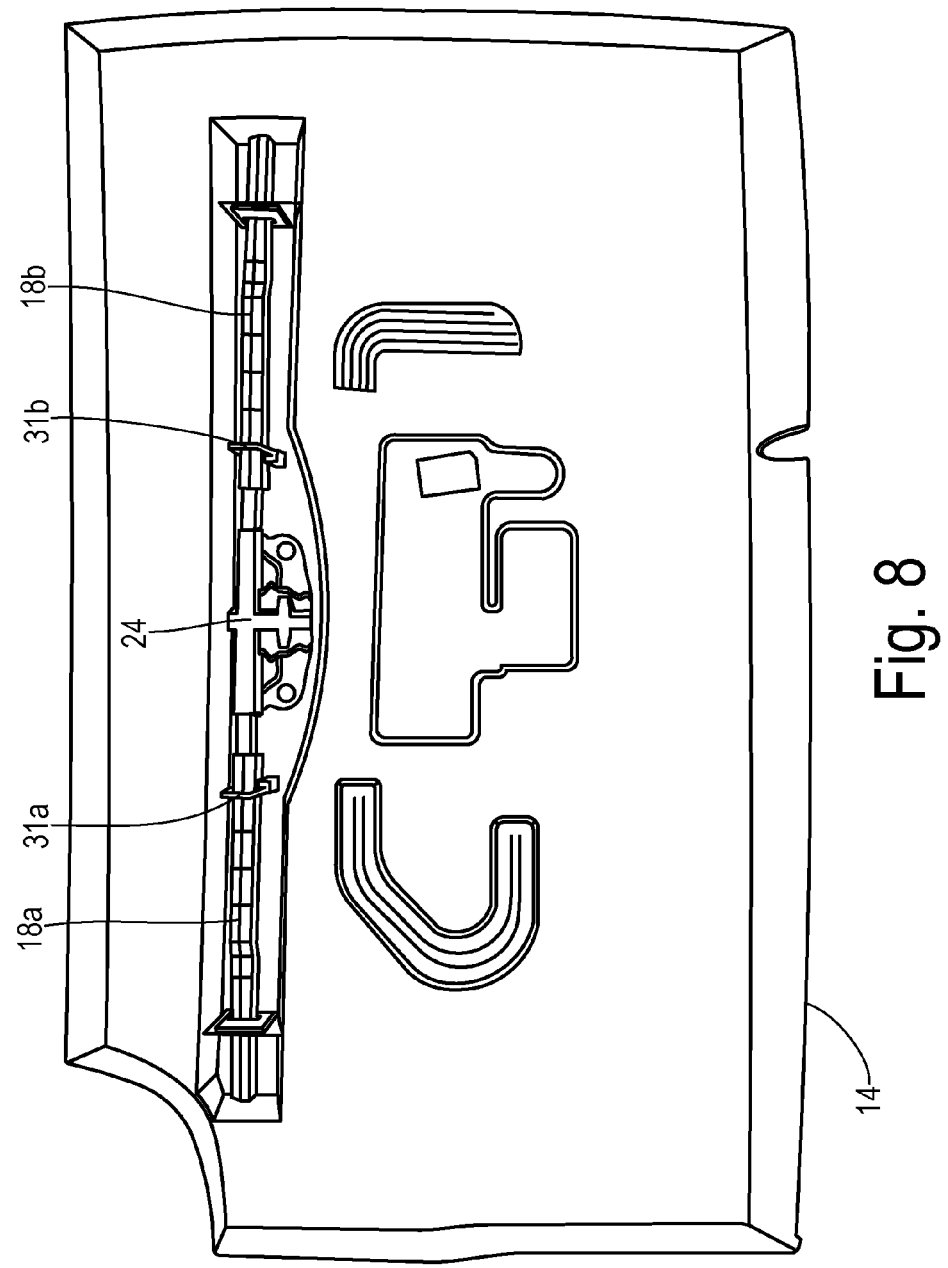
FIG. 8 is an internal, plan view of a door back panel with latch rods and coupler.
Figure 10:
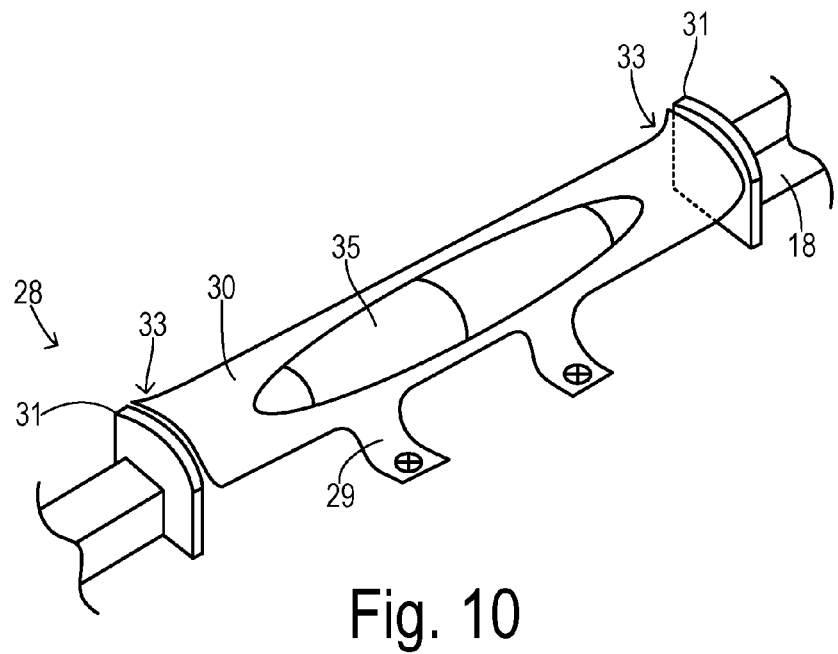
FIG. 10 is a perspective view of a locking plate mounted at the coupler.

FIG. 8 shows an internal, front plan view of the back panel 14 of the door, showing the gear mechanism or coupler 24 with the latch rods 18a and 18b. As shown in FIGS. 4 and 10, the sloped end of latch rod 18a extends from back panel 14 in order to engage the striker. Latch rod 18a has an angled nose which is engaged by the pushbutton plunger during door opening to release latch rod 18a from the striker pocket. Latch rod 18b, also known as a pawl, is coupled to and mirrors the movement of pushbutton-adjacent latch rod 18a through the gear mechanism 24. Pawl fins 31a and 31b are protrusions located along the length of the latch rods 18a and 18b, adjacent the gear mechanism 24. In a collision, the pawl fins, or other interlocking engagement features, are held by the locking plate to retain the latch rods in the latched configuration.

Figure 9:
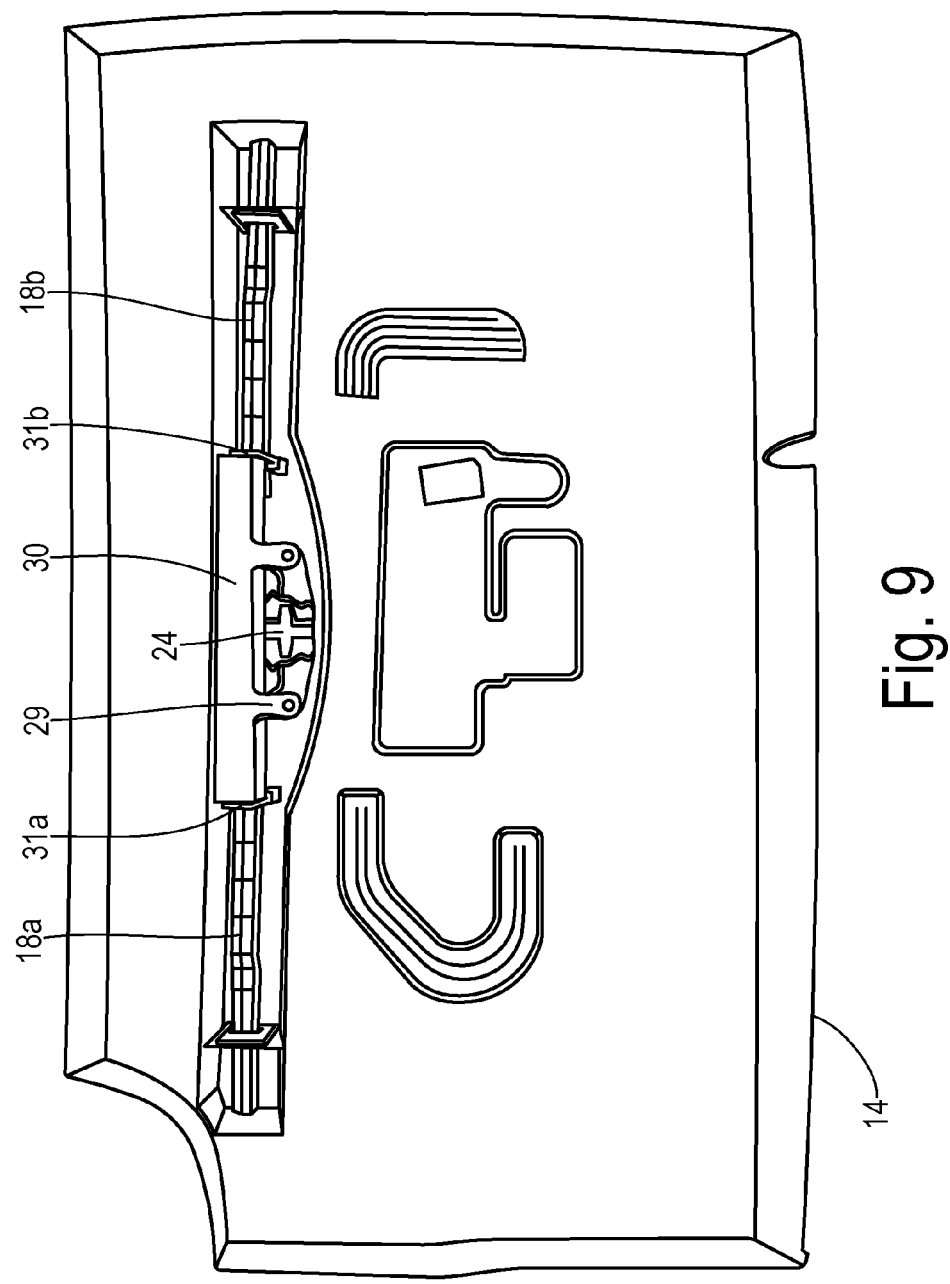
FIG. 9 is an internal, plan view of a door back panel with a locking plate mounted at the coupler.

FIGS. 9 and 10 show an internal view of a door back panel 14 with a locking plate 30 mounted at the coupler 24. The locking plate has lateral edges and a lateral width corresponding to the location of the pawl fins 31a, 31b of the latch rods 18a, 18b in the fully extended, closed configuration. FIG. 9 shows a locking plate 30 embodiment having a shape that is substantially semi-cylindrical, curving vertically around, and placed slightly out from the movement path of the latch rods. The locking plate is mounted by standoff brackets 29 fastened by screws adjacent the coupler 24. In some embodiments, the locking plate 30 is deformable. In some embodiments, the standoff brackets 29 are frangible or bendable.

FIG. 10 shows a locking plate embodiment having a shape similar to the embodiment of FIG. 9 and having additional features of lateral edge flaring 33 and a central bulge 35. In this embodiment, the central portion of the locking plate bulges toward the bolster bladder and away from the latch mechanism, helping to direct the forces and push the locking plate 30 between the pawl fins 31. The lateral edges of the locking plate are flared 33, or angled away from the latch rod mechanism 28. The flaring 33 facilitates movement of the locking plate 30 towards the latch rods 18 and between the pawl fins 31 and inhibits subsequent movement away from the latch 28. The locking plate 30 becomes wedged in place and remains lodged between the pawl fins 31, thereby arresting movement and retraction of the latch rod 18. In some embodiments, the locking plate arresting of latch rod movement is irreversible.

Figure 11:
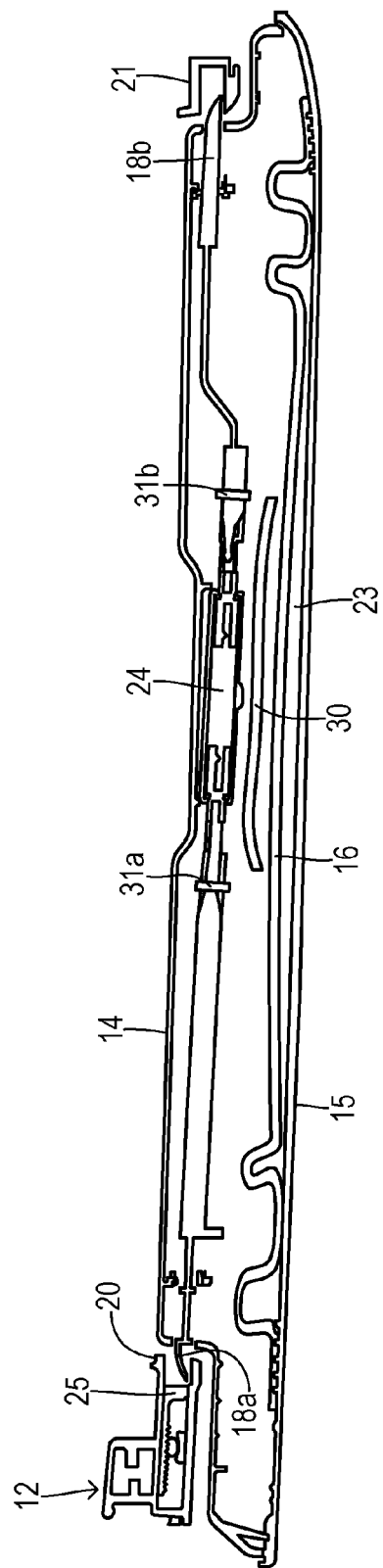
FIG. 11 is a horizontal cross-sectional view of an active glove box system showing a door back panel carrying the latch rods together with the locking plate.

FIG. 11 is a top cross-sectional view of the active bolster glove box door showing back panel 14, trim panel 15, and bladder wall 16. Bladder wall 16 attaches to back panel 14 via welding towers or other attachment points and panel 14 acts as a reaction surface during inflation. Bladder wall 16 is hermetically sealed around its outer periphery with trim panel 15 to create a cavity 23 for receiving inflation gas from the inflator. Outward ends of latch rods 18a and 18b are captured by strikers 20 and 21, respectively. Inward ends of latch rods 18a and 18b are coupled to a gear mechanism 24 configured to provide a complementary reciprocating motion between latch rods 18a and 18b.

Push button mechanism 12 includes gearing which converts movement of a push button into lateral movement. Thus, in response to extension of a plunger 25 within push button mechanism 12 against latch rod 18a when a user pushes in on the push button to open the door, the retraction of latch rod 18a is transmitted to latch rod 18b so that it also retracts. Gear mechanism 24 includes a spring that urges latch rods 18a and 18b towards their extended positions, and the extension of plunger 25 overcomes the spring force. During closing of the door, sliding contact between the sloped ends of latch rods 18a and 18b and the front walls of strikers 20 and 21 causes latch rods 18a and 18b to retract, thus overcoming the spring force until the door closes by a sufficient amount to allow the latch rods to enter the pockets behind the front striker walls.

A rear side of locking plate 30 is positioned immediately adjacent gear mechanism 24 and positioned such that a front surface of the locking plate 30 is adjacent the bladder 16. The width and lateral edges of locking plate 30 are configured to engage pawl fins 31a, 31b upon receiving rearward force from an impact or bolster deployment.

Figure 12:
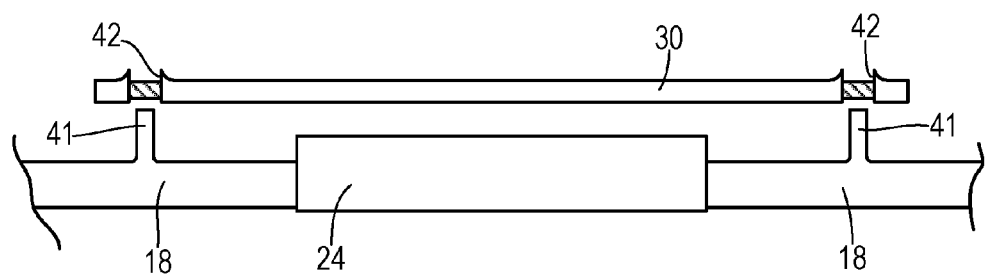
FIG. 12 is a simplified horizontal cross-sectional view of an alternate embodiment of the locking plate with pin-and-hole interlock elements.

FIG. 12 shows a simplified horizontal cross-sectional view of an alternate embodiment of the locking plate with pin-and-hole interlock elements. As in the previous examples, the locking plate 30 is positioned immediately adjacent the latch rods 18 and impelled into a locking position by bolster deployment or impact forces moving the hole 42 of the locking plate 30 into engagement at the pin 41.

Figure 13:
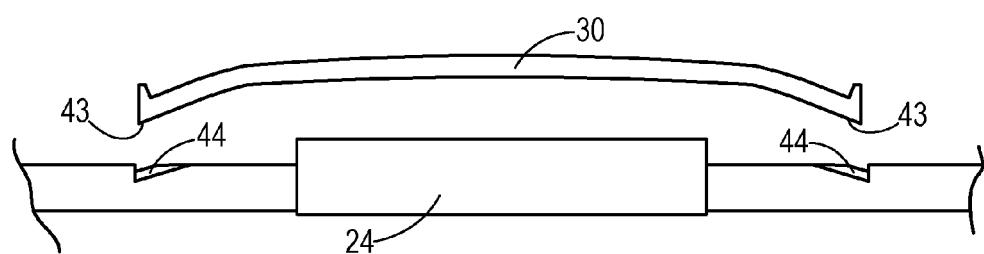
FIG. 13 is a simplified horizontal cross-sectional view of an alternate embodiment of the locking plate with slot or notch and flange interlock elements.

FIG. 13 shows a simplified horizontal cross-sectional view of an alternate embodiment of the locking plate with slot or notch and flange interlock elements. The locking plate 30 is positioned immediately adjacent the latch rods 18 and impelled into a locking position by bolster deployment or impact forces moving the flange 43 of the locking plate 30 into engagement at the notch 44.

Figure 14:
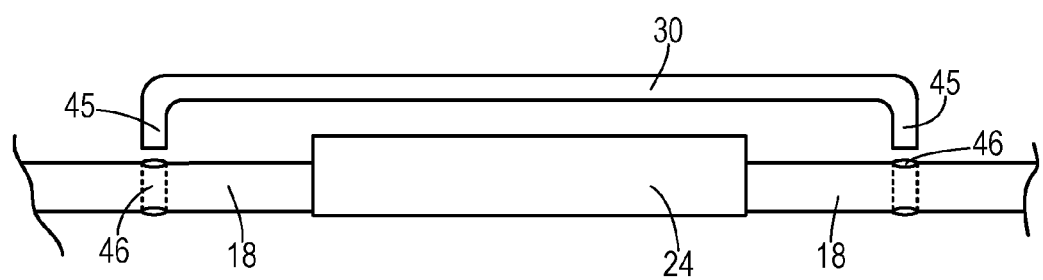
FIG. 14 is a simplified horizontal cross-sectional view of an alternate embodiment of the locking plate with bracket leg and slot interlock elements.

FIG. 14 shows a simplified horizontal cross-sectional view of an alternate embodiment of the locking plate with bracket leg and slot interlock elements. The locking plate 30 is positioned immediately adjacent the latch rods 18 and impelled into a locking position by bolster deployment or impact forces moving the bracket leg 45 of the locking plate 30 into engagement at the slot 46.

Figure 15:
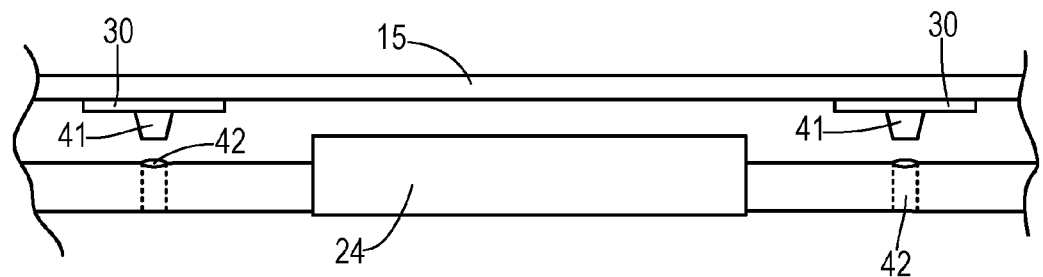
FIG. 15 is a simplified horizontal cross-sectional view of an alternate embodiment of the locking plate with hole and pin interlock elements for a glove box door without an active bolster.

FIG. 15 shows a simplified horizontal cross-sectional view of an alternate embodiment of the locking plate with hole and pin interlock elements for a glove box door without an active bolster. As in the previous examples, the locking plate 30 elements are positioned immediately adjacent the latch rods 18 and impelled into a locking position by impact forces moving the pin 41 of each locking plate 30 element into engagement at the hole 42. In the absence of an active bolster, the locking plate 30 element bay be mounted to the inside surface of the front trim panel 15. Location and spacing of the locking plate 30 elements may be selected to correspond with a predicted passenger knee impact location as well as with the latch elements. For example, a lateral spacing may be about 200 mm, or in the range of 150-250 mm.

Further embodiments of the latch lock may be used with a glove box door lacking an active bolster. In these embodiments, the locking plate is impelled into a locking position by impact forces, such as contact between the knees of a passenger and the trim panel of the glove box door. The mechanisms described are suitable for adapting the disclosed embodiments for use without an active bolster.

In an embodiment, a method is provided for retaining an automotive compartment door in a closed position following a collision, comprising: providing a lockplate and latch system with an active bolster; initiating deployment; inflating a bolster bladder; pushing a wall of the bladder against the locking plate to engage the latch; inhibiting latch movement and arresting the compartment door in a closed position.

In an embodiment, a method is provided for retaining an automotive compartment door in a closed position following a collision, the method comprising: providing a latchrod-engaging lockplate in a vehicle glove box latch system, having: an instrument panel housing defining a door space; a glove box door with a latch rod configured to move between an extended and retracted position; a striker on the housing for retaining a terminus of the latch rod in the extended position; and a locking plate configured to engage the latch rod in an impact, and initiating an impact force, thereby impelling the locking plate to arrest the latch rod.

In an embodiment, an automotive storage compartment is provided, comprising a panel frame with a striker disposed at a door opening; and a door including a back panel carrying a longitudinally-movable latch rod; wherein the latch rod and striker include sliding surfaces that retract the latch rod during door closing and interlock elements that engage to resist movement in response to a force against the door during a crash event in a direction to push the door through the door opening.

In some embodiments the distance between the latch and locking plate is less than 1 mm. In some embodiments the distance between the latch and locking plate is about 1-2 mm. In some embodiments the distance between the latch and locking plate is between about 0.5 and 5.0 mm. In some embodiments the distance between the latch and locking plate is less than 10 mm.

In certain embodiments, the rearward force, from an impact or bolster deployment, may move the locking plate as a unitary structure. In other embodiments it may deform the locking plate into the gap between the pawl fins. In some embodiments, the locking plate is comprised of a plurality of structures. In some embodiments, the force may cause a supporting structure, such as a mounting boss or standoff bracket, to break, bend, or deform, such that the locking plate moves into a locking position. In additional embodiments, the force may cause a portion of the locking plate, such as a protruding pin or catchment, to break off in a mating hole or catch on one or more latch rods. In further embodiments the locking plate may be formed into a sheath or multipart structure to sandwich or capture one or more latch rods and arrest movement.

In particular non-limiting examples of installations and embodiments, the locking plate or lock pins may be formed of steel, aluminum, metal alloys, nylon, resin, plastic, composites, or other materials with suitable properties as to stiffness, deformation, and fracture-resistance. The structure may be adapted by means known in the art, such as with the use of brackets, mounting guides, ridges, grooves, directional slots, structural ribbing, crumple regions, vibration cushioning, non-slip coatings, or other elements, without deviating from the scope of the disclosure. The attachment of the interlock may include screws, rivets, pins, clips, clamps, welds, molding, adhesives, and the like.

The structures and features of the locking structure and system may be adapted for use with various glove box door actuation styles, including lift paddle, side pull, and push button options. Likewise, the structures and features of the locking structure and system may be adapted for use with various glove box latch systems which may include latch rod and pawl, single latch rod, dual latch rod, and other latch systems.

It is to be understood that positional references, such as right, left, top, bottom, upper, and lower, are made for ease of explanation and to describe relative position only. Such terms do not specify positional relationships to the vehicle or environment unless explicitly stated.

The terms and expressions which have been employed are used as terms of description and not of limitation. Whenever a range is given in the specification, all intermediate ranges and subranges, as well as all individual values included in the ranges given are intended to be included in the disclosure. It should be understood that, although the present invention has been specifically disclosed by particular embodiments and examples, optional features, modification and variation of the concepts herein disclosed may be used by those skilled in the art, and such modifications and variations are considered to be within the scope of the invention as defined by the appended claims.

What is claimed is:

1. A vehicle glove box latch system, comprising:
an instrument panel housing defining a door space;
a glove box door comprising a latch rod configured to move between an extended and retracted position;
a striker on the housing for retaining a terminus of the latch rod in the extended position;
a pawl fin on the latch rod; and
a locking plate configured to engage a lateral edge of the locking plate with the pawl fin in an impact, wherein, prior to the impact the locking plate does not engage the pawl fin, and the impact triggers the locking plate to arrest the latch rod.

2. The system of claim 1 wherein the glove box door further comprises:
an inflatable bladder defining a cavity; and
an inflator configured to supply inflation gas into the cavity during an impact in order to inflate the bladder and expand an outer surface of the door toward a passenger of the vehicle.

3. The system of claim 2 wherein inflation of the inflatable bladder is configured to move the locking plate towards the latch rod.

4. The system of claim 3, wherein the locking plate is spaced about 0-3 mm from a portion of the inflatable bladder prior to the impact.

5. The system of claim 1, wherein the locking plate further comprises a central bulge.

6. The system of claim 1 wherein the locking plate is substantially semi-cylindrical.

7. The system of claim 1 wherein the locking plate comprises steel.

8. The system of claim 2, wherein the locking plate further comprises:
a tab extending from a portion of the locking plate adjacent the latch rod, and wherein the tab is positioned in an expansion path of the inflatable bladder, whereby the tab is configured to transmit expansion force to the locking plate.

9. A compartment comprising:
a panel frame with a striker pocket disposed at a door opening;
a door including a back panel carrying a latch system comprising a longitudinally-movable latch rod; and
a locking plate mounted adjacent the latch rod and configured to engage a lateral edge of the locking plate with a fin on the latch rod in an impact, thereby retaining a terminal end of the latch rod in the striker pocket.

10. The compartment of claim 9 wherein:
the lateral edge further comprises a flange, and
whereby the flange is configured to engage the fin.

11. The compartment of claim 9 further comprising:
a bladder defining a cavity;

an inflator configured to supply inflation gas into the cavity during the impact to inflate the bladder and expand an outer surface of the door toward a passenger of the vehicle; and wherein the locking plate further comprises a tab extending from a portion of the locking plate adjacent the latch rod, and wherein the tab is positioned in an expansion path of the bladder, whereby the tab is configured to transmit expansion force to the locking plate.

12. The compartment of claim 9, wherein the latch system comprises a first fin protruding from a first latch rod and a second fin protruding from a second latch rod, wherein the second latch rod is coupled to the first latch rod, whereby the second latch rod mirrors lateral movement of the first latch rod;

wherein the panel frame comprises a first striker pocket configured to retain a first latch rod terminal end, and a second striker pocket configured to retain a second latch rod terminal end; and wherein the locking plate has a lateral width corresponding to a spacing distance between the first fin and the second fin when the first striker pocket retains the first latch rod, and the second striker pocket retains the second latch rod, whereby the locking plate is configured to lodge between the first fin and the second fin in the impact.

13. The compartment of claim 9 further comprising:

a bladder defining a cavity;

an inflator configured to supply inflation gas into the cavity during the impact to inflate the bladder and expand an outer surface of the door toward a passenger of the vehicle; and wherein the locking plate is positioned at a distance adjacent to at least one attachment of the bladder to the back panel, wherein the distance is in a range of 1 to 25 percent of the vertical span of the back panel.

14. The compartment of claim 9 further comprising:

a bladder defining a cavity;

an inflator configured to supply inflation gas into the cavity during the crash event to inflate the bladder and expand an outer surface of the door toward a passenger of the vehicle; and wherein the locking plate is positioned at a distance adjacent to at least one attachment of the bladder to the back panel, wherein the distance is in a range of 1 to 25 percent of the horizontal span of the back panel.

15. A method of retaining an automotive compartment door in a closed position following a collision, comprising:

providing a compartment door comprising: a locking plate, a bolster, and a latch system, wherein the latch system comprises a first fin protruding from a first latch rod;

initiating deployment of the bolster;

inflating a bolster bladder;

pushing a wall of the bladder against the locking plate to move the locking plate from a pre-impact position, wherein the locking plate does not contact the first latch rod, to a post-impact position, wherein a first edge of the locking plate engages with the first fin;

inhibiting movement of the first latch rod; and arresting the compartment door in a closed position.

16. The method of claim 15, further comprising:

deforming the locking plate to engage the latch system.

17. The method of claim 15, further comprising:

bending a standoff bracket, wherein the standoff bracket attaches the locking plate to the latch system.

18. The method of claim 15, wherein the inhibiting movement of the first latch rod is irreversible.

19. The method of claim 15 wherein the latch system further comprises a second fin protruding from a second latch rod, wherein the second latch rod is coupled to the first latch rod, whereby the second latch rod mirrors lateral movement of the first latch rod.

20. The method of claim 19, wherein the locking plate has a lateral width corresponding to a spacing distance between the first fin and the second fin when the first latch rod and second latch rod are in an extended position; and wherein the inhibiting step further comprises: lodging the locking plate between the first fin and the second fin.

* * * * *